United States Patent
Lin et al.

(10) Patent No.: US 7,986,475 B2
(45) Date of Patent: Jul. 26, 2011

(54) LENS MODULE

(75) Inventors: Hou-Yao Lin, Taipei Hsien (TW);
Shih-Chieh Yen, Taipei Hsien (TW);
Hsin-Ho Lee, Taipei Hsien (TW);
Sheng-Jung Yu, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 0 days.

(21) Appl. No.: 12/730,252

(22) Filed: Mar. 24, 2010

(65) Prior Publication Data

US 2010/0290137 A1    Nov. 18, 2010

(30) Foreign Application Priority Data

May 18, 2009 (CN) .......................... 2009 1 0302390

(51) Int. Cl.
*G02B 7/02*      (2006.01)
*G02B 15/14*     (2006.01)
(52) U.S. Cl. .......................... 359/822; 359/694; 359/704

(58) Field of Classification Search .......... 359/694–704,
359/811–824
See application file for complete search history.

(56) References Cited

U.S. PATENT DOCUMENTS

| | | | |
|---|---|---|---|
| 6,424,473 B1 * | 7/2002 | Nakane et al. | 359/827 |
| 6,707,619 B1 * | 3/2004 | Okuno | 359/694 |
| 7,609,959 B2 * | 10/2009 | Yu | 396/133 |

* cited by examiner

*Primary Examiner* — Mohammed Hasan
(74) *Attorney, Agent, or Firm* — Raymond J. Chew

(57) ABSTRACT

An exemplary lens module includes a lens barrel, a first lens, and a second lens. The lens barrel includes an accommodating cavity defined therein. The first lens is received in the accommodating cavity of the lens barrel. The first lens has a first adjusting notch defined at a periphery thereof. The second lens is received in the accommodating cavity of the lens barrel and adjacent to the first lens. The second lens has a second adjusting notch defined at a periphery thereof. The second adjusting notch communicates with the first adjusting notch.

19 Claims, 5 Drawing Sheets

LENS MODULE

BACKGROUND

1. Technical Field

The present disclosure relates to optical imaging and, particularly, to a lens module.

2. Description of Related Art

Generally, a lens module includes a barrel and a plurality of optical elements (e.g., lenses, and infrared-cut filters) received in the barrel. In assembly, the optical elements are assembled into the barrel. However, an eccentricity in the assembled lens module may adversely affect its imaging quality.

Therefore, a new lens module is desired to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
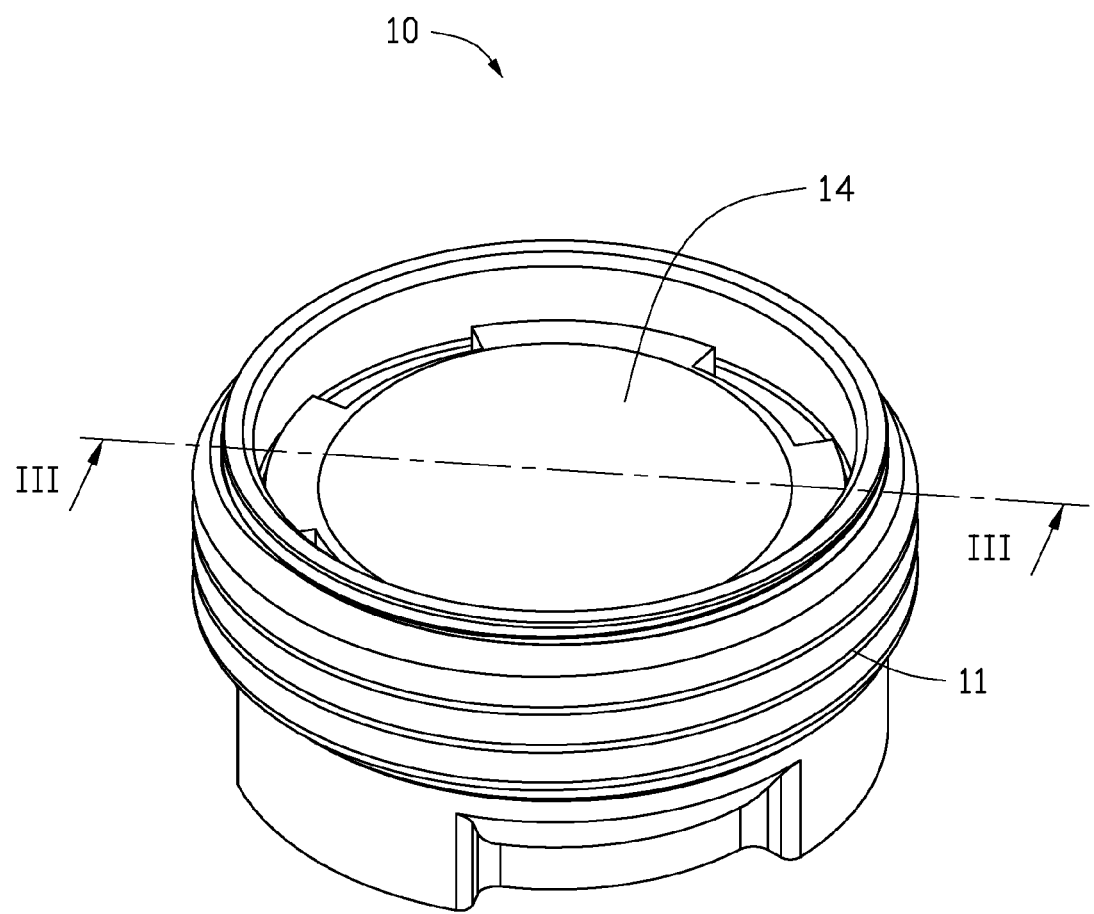
FIG. 1 is a perspective view of a lens module according to a first embodiment.
Figure 2:
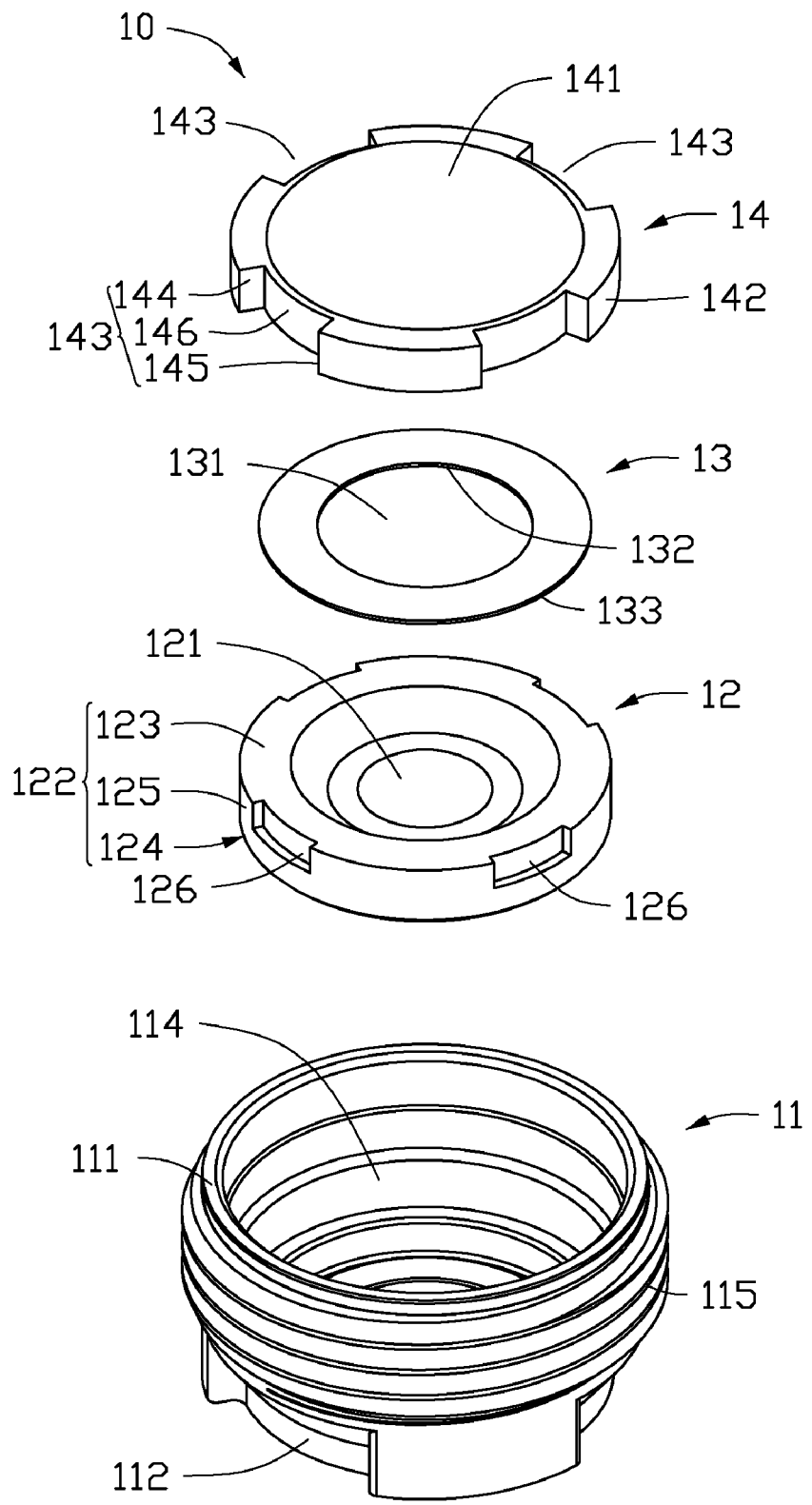
FIG. 2 is an exploded perspective view of the lens module of FIG. 1.
Figure 3:
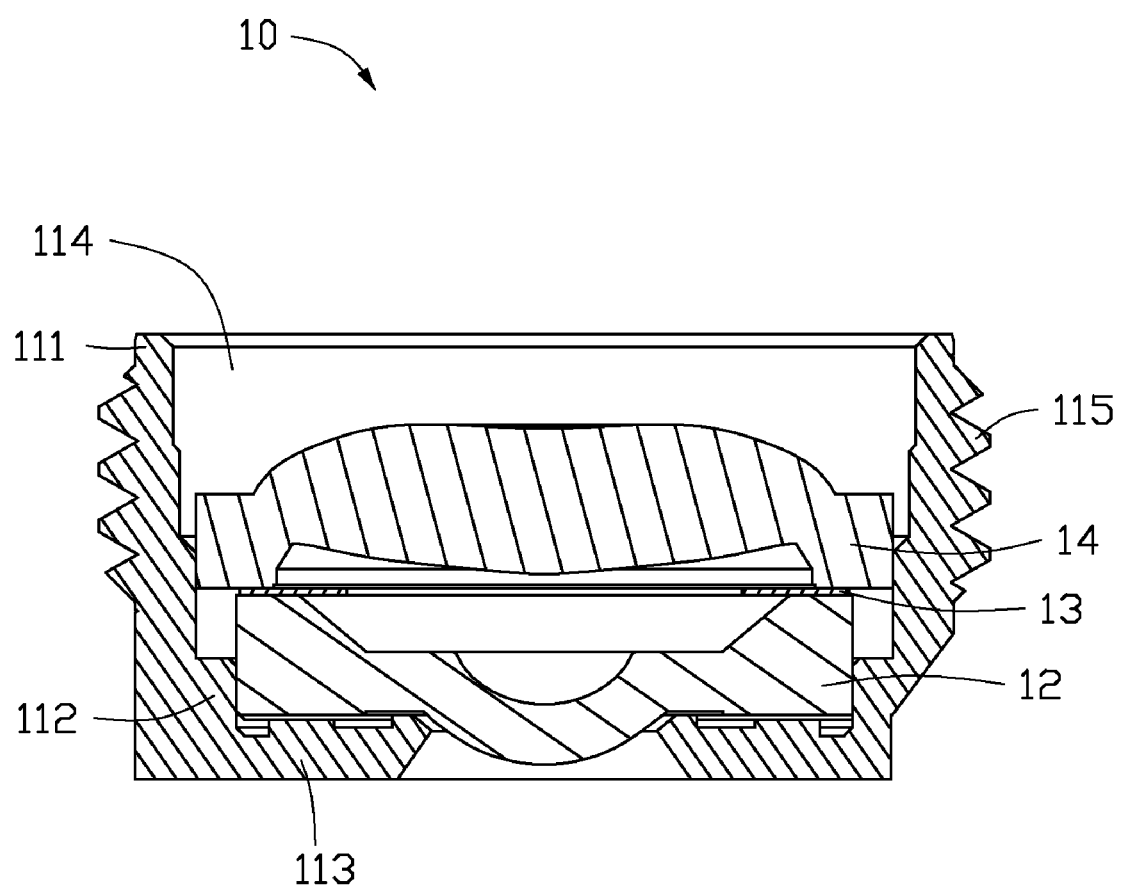
FIG. 3 is a sectional view of the lens module of FIG. 1, taken along the line III-III thereof.

Referring to FIGS. 1-3, a lens module 10 according to a first embodiment is shown. The lens module 10 includes a lens barrel 11, a first lens 12, a spacer 13, and a second lens 14.

The lens barrel 11 is substantially a hollow cylinder, having a first open end 111, an opposite second open end 112, and a lip 113 extending inward from a periphery of the second open end 112. The lens barrel 11 defines an accommodating cavity 114 therein. The first lens 12, the spacer 13, and the second lens 14 are received in the accommodating cavity 114 from an object side to an image side in the order written. Advantageously, an outer surface of the lens barrel 12 has a plurality of threads 115 formed thereon so that the lens barrel 12 can be screwed to a holder (not shown).

The first lens 12 is received in the accommodating cavity 114, and adjoins the lip 113 of the lens barrel 11. The first lens 12 is a substantially round lens, and includes a central optically active part 121 and a peripheral optically inactive part 122 surrounding the active part 121. The inactive part 122 includes a top surface 123 adjoining the second lens 14, a bottom surface 124 opposite to the top surface 123, and a ring-shaped connecting surface 125 between the top surface 123 and the bottom surface 124. The top surface 123 defines a plurality of spaced first adjusting notches 126 at a periphery thereof. Each first adjusting notch 126 is arc-shaped, and extends along the circumference of the first lens 12. In the present embodiment, each first adjusting notch 126 runs through the ring-shaped connecting surface 125, and cannot run through the bottom surface 124.

In alternative embodiments, each first adjusting notch 126 may run through the bottom surface 124, but not through the ring-shaped connecting surface 125. In other alternative embodiments, each first adjusting notch 126 may neither run through the ring-shaped connecting surface 125, nor the bottom surface 124.

The spacer 13 is received in the accommodating cavity 114, and is located between the first lens 11 and the second lens 12 for creating a space between the first lens 11 and the second lens 12. The spacer 13 cannot fully cover the first adjusting notches 126, so an adjusting member (not shown) can be easily inserted into the first adjusting notches 126, thereby adjusting the first lens 11. The spacer 13 is substantially ring-shaped, and includes a through hole 131 defined at the center thereof, an inner sidewall 132, and an outer sidewall 133 coaxial to the inner sidewall 132. The through hole 131 corresponds to the optically active part 121 enabling passage of light through the spacer 13. The outer diameter of the spacer 13 is smaller than that of the first lens 12, such that the spacer 13 cannot prevent the adjusting member from penetrating the first adjusting notches 126.

Figure 4:
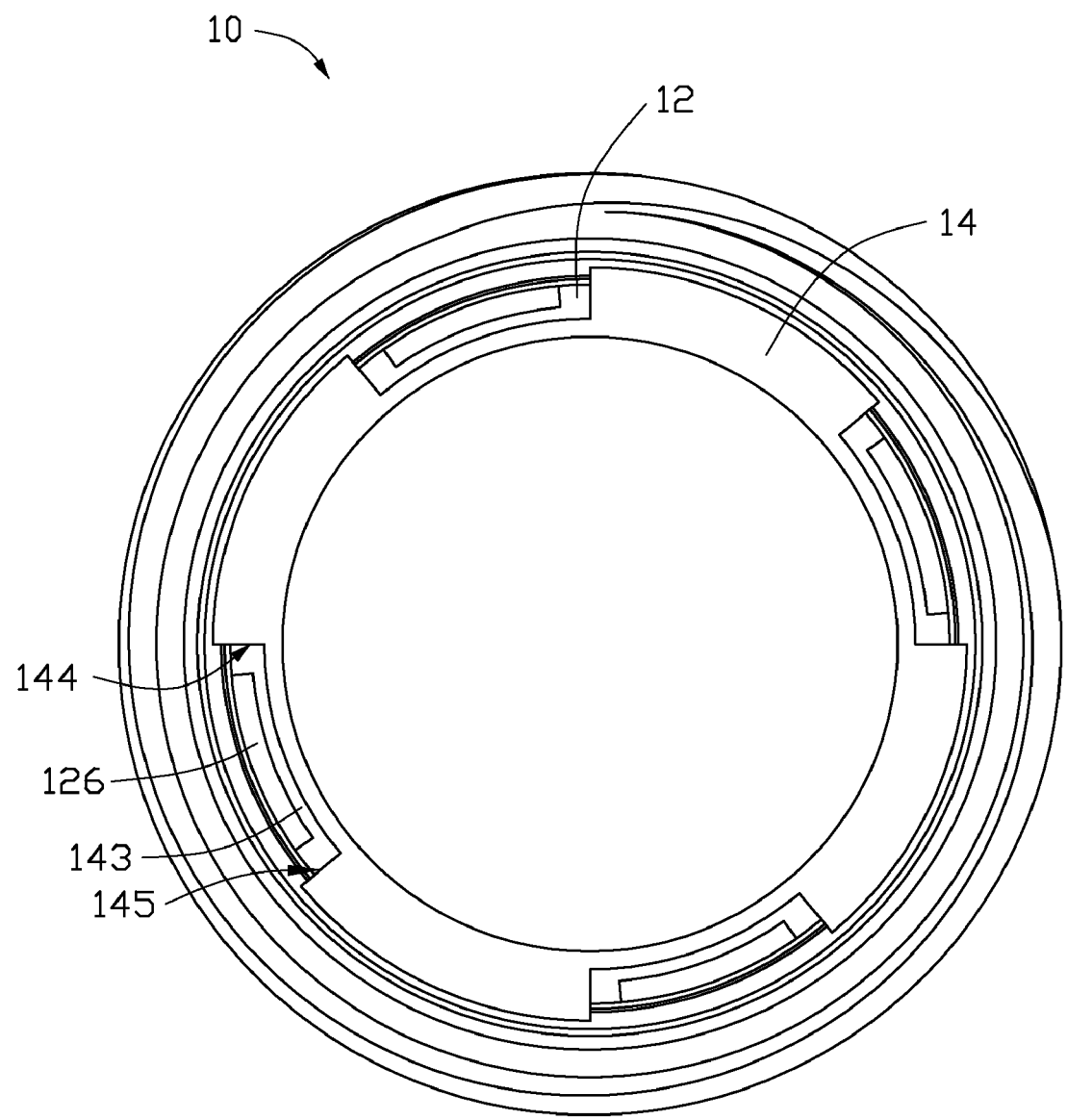
FIG. 4 is a top plan view of the lens module of FIG. 1.

The second lens 14 is received in the accommodating cavity 114, and adjacent to the first lens 11. Like the first lens 12, the second lens 14 includes an optically active part 141, an optically inactive part 142, and a plurality of spaced second adjusting notches 143 defined at a periphery thereof. Each second adjusting notch 143 is arc-shaped and extends along the circumference of the second lens 14. Each second adjusting notch 143 includes a first sidewall 144, an opposite second sidewall 145, and an arc-shaped connecting sidewall 146 between the first sidewall 144 and the second sidewall 145. In the present embodiment, the number of the second adjusting notches 143 is similar to the first adjusting notches 126; the second adjusting notches 143 correspond to, and communicate with the respective first adjusting notches 126. At least a part of each first adjusting notch 126 is located between the first sidewall 144 and the second sidewall 145 of the corresponding second adjusting notches 143, such that the adjust member can penetrate the second lens 14 through to the corresponding first adjusting notch 126, thereby adjusting the first lens 12. In the present embodiment, each first adjusting notch 126 is located between the first sidewall 144 and the second sidewall 145 of the corresponding second adjusting notches 143 (see FIG. 4).

It should be noted that in alternative embodiments, the first lens 12 can include only one first adjusting notch 126, and the second lens 14 can include only one second adjusting notch 143 corresponding to the first adjusting notch 126.

A method for making the lens module 10 is also provided as follows.

First, the first lens 12, the spacer 13, and the second lens 14 are assembled into the lens barrel 11 sequentially such that at least a part of each first adjusting notch 126 is located between the first sidewall 144 and the second sidewall 145 of the corresponding second adjusting notches 143. That is, the first adjusting notches 126 communicate with the corresponding second adjusting notches 143.

Second, the lens module 10 is measured to check for any eccentricities. If eccentricity exists, an adjusting member such as a rod or other stick-like apparatus (not shown) is inserted into an adjusting notch of a lens (e.g., the first adjusting notch 126 of the first lens 12) via the corresponding second adjusting notch 143 to drive the lens (e.g., the first lens 12) to rotate clockwise or counterclockwise until the eccentricity is reduced or eliminated. Thus, the eccentricity of the lens module 10 can usually be corrected.

Third, an adhesive can be applied to the lens (e.g., the first lens 12) to securely fix the lens (e.g., the first lens 12) with the lens barrel 11.

When an eccentricity occurs in the lens module 10, the eccentricity is reduced or eliminated by using the above method due to the configuration of the lens module 10 (e.g., the first adjusting notches 126 in the first lens 12 and the second adjusting notches 143). Accordingly, imaging quality of the lens module 10 is greatly enhanced.

Figure 5:
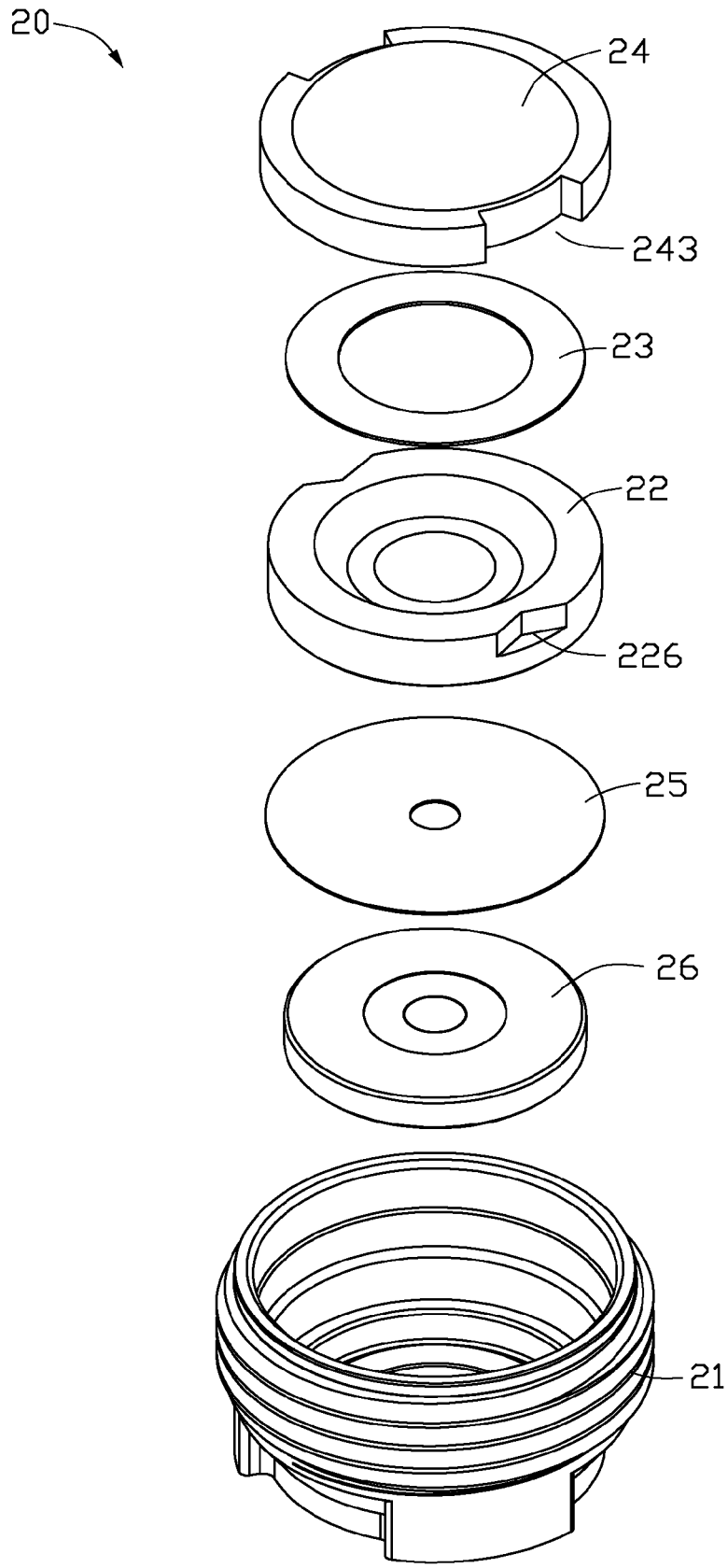
FIG. 5 is an exploded perspective view of a lens module according to a second embodiment.

Referring to FIG. 5, a lens module 20 similar to the lens module 10, in accordance with a second embodiment, is shown. The lens module 20 includes a lens barrel 21, a first lens 22 having two first adjusting notches 226, a spacer 23, a second lens 24 having two second adjusting notches 243, a light blocking plate 25, and a third lens 26. In the present embodiment, each first adjusting notch 226 is V-shaped.

In assembly, the third lens 26, the light blocking plate 25, a first lens 22, a spacer 23, and a second lens 24 are assembled into the lens barrel 11 sequentially such that each first adjusting notch 226 is corresponding to the second adjusting notches 243. In the event of any eccentricities, the adjusting member is inserted into an adjusting notch of the lens (e.g., the first adjusting notch 226 of the first lens 22) via the corresponding second adjusting notch 243 to drive the lens (e.g., the first lens 22) to rotate clockwise or counterclockwise until the eccentricity is reduced or eliminated.

While certain embodiments have been described and exemplified above, various other embodiments from the foregoing disclosure will be apparent to those skilled in the art. The present disclosure is not limited to the particular embodiments described and exemplified but is capable of considerable variation and modification without departure from the scope and spirit of the appended claims.

What is claimed is:

1. A lens module comprising:
   a lens barrel comprising an accommodating cavity defined therein;
   a first lens received in the accommodating cavity of the lens barrel, the first lens having a first adjusting notch defined at a periphery thereof; and
   a second lens received in the accommodating cavity of the lens barrel and adjacent to the first lens, the second lens having a second adjusting notch defined at a periphery thereof, the second adjusting notch communicating with the first adjusting notch, the second adjusting notch being arc-shaped and extending along the circumference of the second lens, the second adjusting notch comprising a first sidewall and an opposite second sidewall, and at least a part of the first adjusting notch being located between the first sidewall and the second sidewall of the second adjusting notch.

2. The lens module of claim 1, wherein the first lens comprises a central optically active part and a peripheral optically active part surrounding the optically active part; the central optically active part of the first lens comprises a top surface adjoining the second lens, a bottom surface opposite to the top surface, and a ring-shaped connecting surface between the top surface and the bottom surface; and the first adjusting notch is defined in the top surface.

3. The lens module of claim 2, wherein the first adjusting notch runs through the ring-shaped connecting surface but does not run through the bottom surface.

4. The lens module of claim 2, wherein the first adjusting notch runs through the bottom surface but not through the ring-shaped connecting surface.

5. The lens module of claim 2, wherein the first adjusting notch runs neither through the bottom surface nor the ring-shaped connecting surface.

6. A lens module comprising:
   a lens barrel comprising an accommodating cavity defined therein;
   a first lens received in the accommodating cavity of the lens barrel, the first lens having a first adjusting notch defined at a periphery thereof; and
   a second lens received in the accommodating cavity of the lens barrel and adjacent to the first lens, the second lens having a second adjusting notch defined at a periphery thereof, the second adjusting notch communicating with the first adjusting notch, the second adjusting notch being arc-shaped and extending along the circumference of the second lens, the second adjusting notch comprising a first sidewall, and an opposite second sidewall, the first adjusting notch being located between the first and second sidewalls.

7. The lens module of claim 6, wherein the first lens comprises a central optically active part and a peripheral optically active part surrounding the optically active part, and the first adjusting notch is defined in the periphery of the optically inactive part.

8. The lens module of claim 7, wherein the central optically active part of the first lens comprises a top surface adjoining the second lens, a bottom surface opposite to the top surface, and a ring-shaped connecting surface between the top surface and the bottom surface; and the first adjusting notch is defined in the top surface.

9. The lens module of claim 8, wherein the first adjusting notch runs through the ring-shaped connecting surface but does not run through the bottom surface.

10. The lens module of claim 8, wherein the first adjusting notch runs through the bottom surface but not through the ring-shaped connecting surface.

11. The lens module of claim 8, wherein the first adjusting notch runs neither through the bottom surface nor the ring-shaped connecting surface.

12. A lens module comprising:
   a lens barrel comprising an accommodating cavity defined therein;
   a round first lens received in the accommodating cavity of the lens barrel, the first lens having a first adjusting notch defined at a periphery thereof;
   a second lens received in the accommodating cavity of the lens barrel and adjacent to the first lens, the second lens having a second adjusting notch defined at a periphery thereof, the second adjusting notch communicating with the first adjusting notch, the second adjusting notch being arc-shaped and extending along the circumference of the second lens, the second adjusting notch comprising a first sidewall, and an opposite second sidewall, the first adjusting notch being located between the first and second sidewalls; and
   a ring-shaped spacer received in the accommodating cavity of the lens barrel and between the first and second lenses, the outer diameter of the ring-shaped spacer being smaller than that of the first lens.

13. The lens module of claim 12, wherein the first lens comprises a central optically active part and a peripheral optically active part surrounding the optically active part, and the first adjusting notch is defined in the periphery of the optically inactive part.

14. The lens module of claim 13, wherein the central optically active part of the first lens comprises a top surface adjoining the second lens, a bottom surface opposite to the top surface, and a ring-shaped connecting surface between the top surface and the bottom surface; and the first adjusting notch is defined in the top surface.

15. The lens module of claim 14, wherein the first adjusting notch runs through the ring-shaped connecting surface but not through the bottom surface.

16. The lens module of claim 14, wherein the first adjusting notch runs through the bottom surface but not through the ring-shaped connecting surface.

17. The lens module of claim 14, wherein the first adjusting notch runs neither through the bottom surface nor the ring-shaped connecting surface.

18. The lens module of claim 12, wherein the first adjusting notch is arc-shaped and extends along the circumference of the first lens.

19. The lens module of claim 12, wherein the first adjusting notch is V-shaped.

* * * * *